G. B. PILKINGTON.
GEARING.
APPLICATION FILED JAN. 19, 1909.
955,198.
Patented Apr. 19, 1910.
3 SHEETS—SHEET 2.
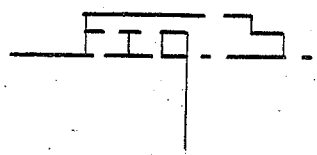
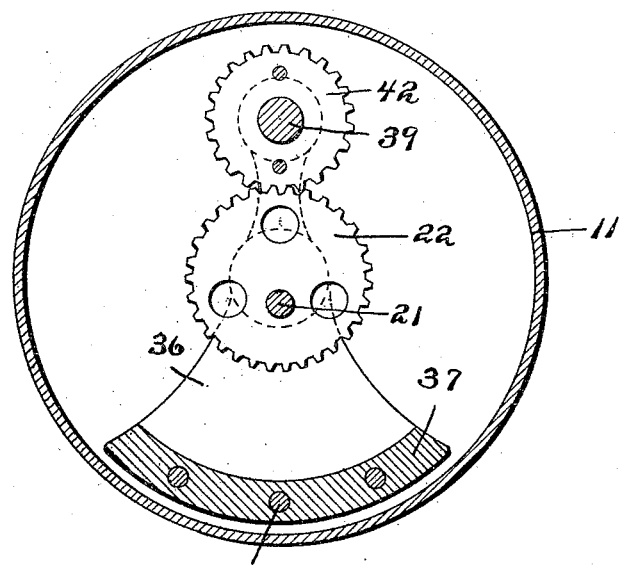
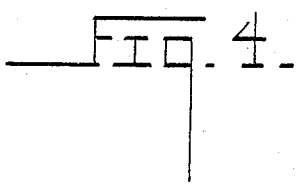
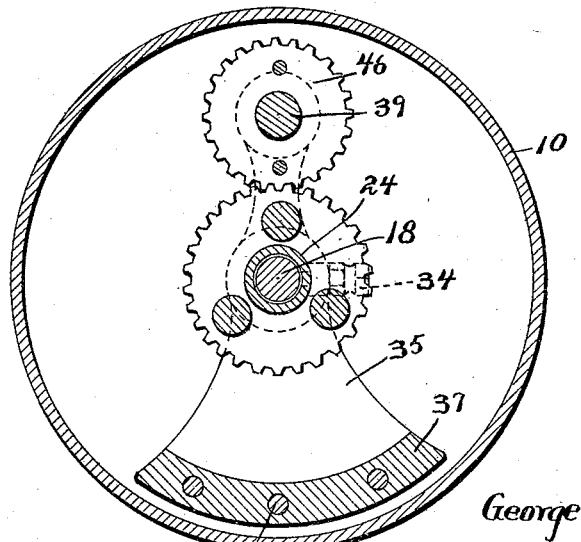
Witnesses
E. E. Johansen
E. L. Chandlee
Inventor
George B. Pilkington
By Woodward & Chandlee
Attorneys.

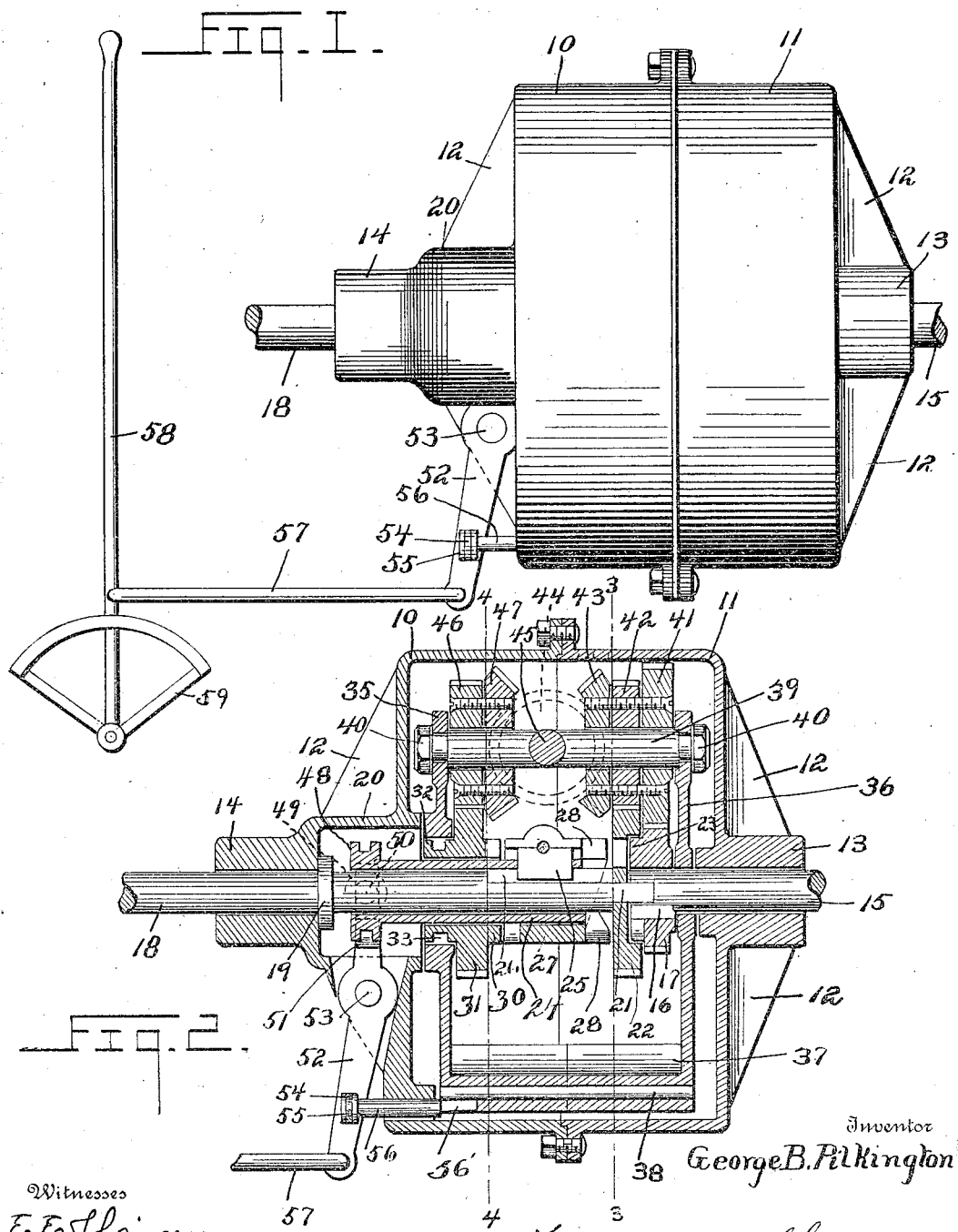

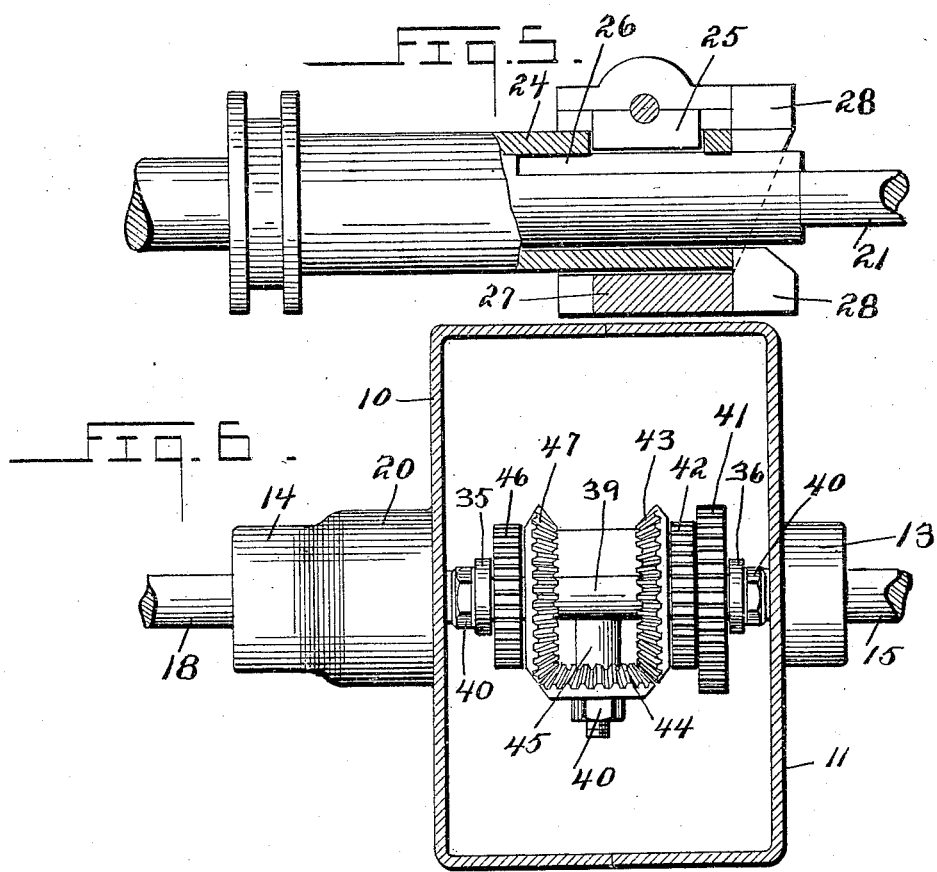

UNITED STATES PATENT OFFICE.

GEORGE B. PILKINGTON, OF WATERBURY, CONNECTICUT.

GEARING.

955,198. Specification of Letters Patent. Patented Apr. 19, 1910.

Application filed January 19, 1909. Serial No. 473,066.

*To all whom it may concern:*

Be it known that I, GEORGE B. PILKINGTON, a citizen of the United States, residing at Waterbury, in the county of New Haven and State of Connecticut, have invented certain new and useful Improvements in Gearing, of which the following is a specification.

This invention relates to mechanical movements and has special reference to a device known as a planetary power transmission.

The invention has for an object the provision of a novel transmission by which two forward speeds and one reverse may be obtained by adjustment of the mechanism.

The invention has for another object the provision of a device of this character in which shifting gears are eliminated which thereby avoids the stripping of the gears and thus produces a transmission which is simple of construction, is strong and compact and which is economical to manufacture and to maintain.

A still further object of the invention is the provision of a transmission of this type which is controlled by a single lever which is regulated in its several movements by the segment of common use.

A still further object of the invention is to provide a transmission of this character with a sealed casing which is adapted to be filled with a lubricant to produce a noiseless and smooth running of the gears of the same.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of the transmission showing the manner of connecting the same to a hand lever by means of which the device is adapted to be operated, Fig. 2 is a longitudinal vertical section of the device, Fig. 3 is a transverse section on the line 3—3 of Fig. 2, Fig. 4 is a transverse view on the line 4—4 of Fig. 2, Fig. 5 is a detailed view of the locking sleeve as applied to the transmission shaft, Fig. 6 is a top plan view of the device, the casing being shown in section.

Referring to the drawings, 10 and 11 designate the sections of a casing which is substantially rectangular in contour and which is provided centrally thereof with the webs 12 for the purpose of reinforcing the casing and to firmly secure the same to the journal boxes 13 and 14 positioned at the opposite ends of the casing. The journal box 13 supports the rear extremity of the main driving shaft 15 which is longitudinally recessed at its inner extremity to receive a key 16 which serves to lock a gear 17 rigidly to the shaft 15 for the purpose of imparting motion to the several operative parts of the device. The journal box 14 carries the forward extremity of a transmission shaft 18 which is provided with a collar 19 positioned rigidly about the shaft 18 adjacent the inner face of the journal box 14 in a reduced portion 20 of the casing section 10 for the purpose of preventing the shaft 18 from being withdrawn from the journal box 14. The forward extremity of the transmission shaft 18 is reduced as at 21 for the purpose of entering in a centrally positioned recess formed in the rear extremity of the main drive shaft 15 which acts as a support for the forward extremity of the transmission shaft 18. The shaft 18 carries a gear 22 at its forward reduced end which is of larger diameter than the gear 17 and which is recessed at its adjoining face to receive an offset portion 23 of the gear 17, the gear 22 having a plurality of apertures formed concentrically with the shaft 18 to register with a plurality of apertures formed in the adjoining face of the offset portion 23. The gear 22 is loosely carried upon the shaft 18. A sliding sleeve 24 is disposed upon the shaft 18 within the casing and is splined to this shaft and held against rotative movement thereabout by means of a key 25 which is extended through the sleeve 24 into a longitudinally formed groove 26 formed in one side of the shaft 18 in which slot the key is slidably held. The key 25 is carried by a locking collar 27 which is rigidly secured to the sliding sleeve 24 by means of the key 25 which is extended through the side of the sleeve 24 and prevented from rotative or longitudinal movement thereto. The locking collar 27 is provided with a plurality of dogs 28 as shown in Fig. 5 which are longitudinally extended from the forward end thereof and are adapted to engage in apertures formed through the gear 22. The dogs 28 are formed of sufficient length to extend through the gear 22 and to engage in the apertures formed in the offset portion 23 of the gear 17. The opposite extremity of the locking collar 27 is provided with a plurality of recesses 29 into which are adapted to be inserted the dogs 30 disposed upon the face of a gear 31 which is loosely mounted upon the operating sleeve 24. The gear 31 is provided with a rearwardly extending collar 32 which is provided with a peripheral groove 33 into which are fitted the inner extremities of set screws 34 shown in dotted lines in Fig. 4 adjustably positioned through the central enlarged and apertured portion of an arm 35 loosely mounted about the collar 32. The arm 35 is rotatably disposed about the collar 32 and operates in parallel with a second arm 36 which is loosely disposed about the main shaft 15 against the inner face of the journal box 13. The arms 35 and 36 are connected by a counterbalancing weight 37 laterally disposed from the extremities of the same and secured by means of the bolts 38 disposed through the same. The opposite extremities of the arms 35 and 36 are provided with a spider 39 which is disposed through the same and secured in position by means of the nuts 40 positioned upon the outer extremities of the spider arms upon the outer faces of the arms 35 and 36. The spider 39 is provided adjacent the arm 36 with gears 41 and 42 which are adapted to mesh respectively with the gears 17 and 22 and which are rigidly secured to each other for simultaneous rotation. The gear 42 carries a bevel gear 43 positioned upon the inner face thereof which is meshed with a beveled gear 44 disposed upon the arm 45 of the spider 39. A gear 46 is mounted upon the spider 39 adjacent the arm 35 which is meshed with the gear 31 and which carries a beveled gear 47 for engagement with the beveled gear 44 for the purpose of imparting rotation to the gears 46 and 31.

For the purpose of operating the device, the sleeve 24 is provided with a grooved collar 48 into which are fitted the segments 49 which are oppositely disposed in the groove thereof, in slidable contact therewith, the segments 49 being provided with shanks 50 which engage in the apertured extremities of the fork arms 51 of the lever 52. The lever 52 is fulcrumed intermediately upon a pin 53 disposed in one side of the reduced portion 20 of the casing section 10 and is adapted for movement thereabout. The outer extremity of the lever 52 is provided with a laterally extended and pivotally mounted collar 54 for engagement between the flanges 55 formed upon the outer extremity of a sliding bolt 56 disposed through the rear end of the casing section 10 and adapted for engagement in the recess 56' formed in the weighted arm 35 to prevent the rotation of the same when desired. The outer extremity of the lever 52 is also apertured to receive the end of a link 57 which is connected to a hand lever 58 pivotally supported to any suitable and adjacent frame. The lever 58 is provided with a rack segment 59 and is operated in conjunction therewith in the usual manner.

The operation of the device is as follows: When the shaft 15 is actuated and it is desired to impart a low speed to the transmission shaft 18, the lever 52 is rocked to slide the operating sleeve 24 forwardly carrying the locking collar 27 and engaging the dogs 28 in the apertures formed through the gear 22. The main shaft 15 is now rotated carrying the gear 17 which acts upon the gear 41 to rotate the gear 42 and revolve the gear 22 in the opposite direction to the gear 17 to carry the locking collar 27 and the transmission shaft 18 by reason of the locking engagement of the key 25 therewith. When in this position the bolt 56 still remains in the recess 56' in the weighted extremity of the arm 35 and prevents the rotative movement of the same. When it is desired to obtain a direct or high speed drive upon the shaft 18 the lever 52 is thrown forward to a further degree causing the dogs 28 to project through the apertures formed in the gear 22 and to engage in the recesses positioned in the adjacent face of the offset portion 23 of the gear 17. With this arrangement the main shaft 15 revolves and carries the gear 17 and the locking collar 27, by reason of the engagement of the dogs 28 and thus rotates the transmission shaft 18 through the medium of the key 25. Simultaneously with this action the bolt 56 is withdrawn from the recess 56' in the counterweight 37 to a sufficient degree to admit of the rotation of the arms 35 and 36 which revolve about the shafts 15 and 18 and act as a balance wheel for the train of gears. To reverse the mechanism the lever 52 is thrown backwardly against the casing which causes the operating sleeve 24 to be moved toward the flange 19 upon the transmission shaft 18 and to throw the locking collar 27 in engagement with the dogs 30 upon the gear 31. At the same time the locking bolt 56 is brought into engagement with the arm 35 to prevent the rotation thereof. The main shaft 15 now revolves carrying the gear 17 which actuates the gear 41 and the gear 43 to cause the rotation of the gear 46 through the medium of the beveled gears 44 and 47 to rotate the gear 31 and to carry the locking collar 27 therewith. This motion is transmitted to the shaft 18 through the medium of the key 25 carried by the locking sleeve 27 and engaged in the longitudinally formed slot 26.

What is claimed is:—

1. In a device of the class described, the combination with a casing, of a gear train disposed in said casing, a main shaft extended into said casing, a gear keyed on said shaft meshed with said gear train, a transmission shaft disposed in said casing, a sleeve slidably disposed on said transmission shaft, a collar carried by said sleeve, adapted to engage with the gear on the main shaft to impart rotary motion to said transmission shaft, a lever pivotally mounted in said casing and connected to said sleeve to actuate the same, supporting arms positioned in said casing to support said gear train, and means connected to said lever and slidably positioned in said casing adapted to engage with said arms to hold said gear train against rotation about said shafts.

2. In a device of the class described, the combination with a main shaft, of a transmission shaft, the extremity of said transmission shaft being reduced and positioned in the end of the main shaft, arms disposed upon each of said shafts, said arms carrying counterbalance weights, a gear train mounted between said arms and supported thereby, a gear keyed on the main shaft and meshed with said gear train, a gear loosely disposed on the reduced extremity of said transmission shaft in mesh with said gear train, a collar slidably mounted on said transmission shaft adapted to have locking engagement with the gear on said main shaft and the gear on said transmission shaft, an operating lever pivotally mounted in said casing adapted to actuate said collar, and means carried by said lever and extended through said casing adapted to engage in the weighted end of one of said arms, to prevent the independent rotary movement of said gear train about said shaft.

3. In a device of the class described, the combination with a casing, of a main shaft mounted in said casing, a transmission shaft mounted in said casing, the inner end of said transmission shaft being reduced in diameter and positioned in the end of said main shaft, of spaced parallel arms mounted upon said shafts within said casing, said arms carrying counterbalance weights, a spider positioned in opposed ends of said arms, a train of gears mounted on said spider, bolts connecting said weights, a gear keyed upon the main shaft meshed with said gear train, said gear having recesses formed in one face thereof, a gear loosely disposed upon the reduced end of said transmission shaft, said gear having apertures formed therethrough in alinement with the recesses in the gear on said main shaft, each of said gears being meshed with one of the gears upon said spider, a sleeve slidably mounted upon said transmission shaft, a collar carried by said sleeve and keyed to said transmission shaft, said collar having dogs formed therein adapted to be engaged with the recesses and apertures in said gears, a gear positioned upon said sleeve, a set screw extending through one of said arms engaging with said gear to hold the same against longitudinal movement with said sleeve, said gear having locking engagement with said collar and disposed in mesh with said gear train, a lever pivotally mounted in said casing connected to said sleeve to actuate the same, and a bolt pivotally connected to said lever and slidably disposed through said casing, said bolt being normally positioned in a recess formed in the weight on one of said arms to hold said gear train against independent rotary movement about said shafts.

4. In a device of the class described, the combination with a main shaft, a gear on said shaft, a transmission shaft, a train of gears meshed with the gear on said main shaft, a collar disposed on said transmission shaft for engagement with the gear on said main shaft for direct rotation of said transmission shaft, means for moving said collar longitudinally on said transmission shaft, a gear loosely disposed on said transmission shaft meshed with said gear train for opposite rotary movement to the gear on said main shaft, said gear having locking engagement with said collar, said collar being keyed to said transmission shaft to prevent relative rotation thereof, arms disposed on said shaft to support said gear train, said arms carrying counterbalance weights, and a bolt carried by said collar actuating means engaging with one of said arms to hold said gear train against rotation with relation to said shaft.

5. In a device of the class described, the combination with a main shaft, a gear keyed to said shaft, a train of gears, one of which is meshed with said gear, a transmission shaft, a gear loosely mounted on said transmission shaft in engagement with one gear of said train of gears, a collar slidably disposed upon said transmission shaft and keyed thereto, said collar having a plurality of dogs formed integral therewith for engagement in apertures formed through said loosely mounted gear, said dogs having engagement at certain times through said loosely mounted gear and into recesses formed in said gear on said main shaft, a second gear loosely mounted about said transmission shaft and meshed with one gear of said train of gears for opposite rotative movement, said last named gear having integrally formed dogs disposed laterally for engagement with said collar to impart opposite rotation to said transmission shaft, arms disposed in parallel relation on said shaft for supporting said gear train, said arms being weighted at one end to counterbalance said gear train, a casing arranged about said gears, a sliding bolt mounted in said casing, said bolt being normally positioned in a recess formed in said weight to lock said arms and gear train from rotative movement, and means for simultaneously sliding said collar and bolt.

In testimony whereof I affix my signature, in presence of two witnesses.

GEORGE B. PILKINGTON.

Witnesses:
CHARLES E. BRADSHAW,
EDWARD R. COOKE.